United States Patent
Dommnik et al.

(10) Patent No.: US 11,300,182 B2
(45) Date of Patent: Apr. 12, 2022

(54) SIDE PORTION, CHAIN LINK AND ENERGY GUIDING CHAIN

(71) Applicant: Igus GmbH, Cologne (DE)

(72) Inventors: Joerg Dommnik, Neunkirchen-Seelscheid (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 476 days.

(21) Appl. No.: 16/095,665

(22) PCT Filed: Apr. 19, 2017

(86) PCT No.: PCT/EP2017/059239
§ 371 (c)(1),
(2) Date: Oct. 22, 2018

(87) PCT Pub. No.: WO2017/182494
PCT Pub. Date: Oct. 26, 2017

(65) Prior Publication Data
US 2019/0145497 A1 May 16, 2019

(30) Foreign Application Priority Data
Apr. 22, 2016 (DE) ...................... 20 2016 002 624.1

(51) Int. Cl.
*F16G 13/16* (2006.01)

(52) U.S. Cl.
CPC .................................... *F16G 13/16* (2013.01)

(58) Field of Classification Search
CPC .......... F16G 13/15; F16G 13/16; F16G 13/18; F16G 15/12; F16G 13/12; F16G 13/00; F16G 13/14; F16G 15/14
See application file for complete search history.

(56) References Cited

U.S. PATENT DOCUMENTS

| 4,625,507 A | 12/1986 | Moritz et al. |
| 5,771,676 A | 6/1998 | Komiya et al. |

(Continued)

FOREIGN PATENT DOCUMENTS

| DE | 29607492 U1 * | 4/1996 | ............ F16G 13/16 |
| DE | 29607492 | 10/1997 | |

(Continued)

OTHER PUBLICATIONS

Translation: Igus, DE-29607492-U1, Translated Jan. 12, 2021 (Year: 1996).*

(Continued)

*Primary Examiner* — Gregory D Swiatocha
*Assistant Examiner* — Bobby Yeonjin Kim
(74) *Attorney, Agent, or Firm* — Grossman, Tucker, Perreault & Pfleger, PLLC

(57) ABSTRACT

A side portion for a chain link of an energy guiding chain. The side portion has at its ends a respective overlap region which, for limiting pivotal movement, are provided with corresponding abutment surfaces and with a pivot axis, that is to say a first overlap region having first abutment surfaces and a second overlap region having second abutment surfaces. For damping of the pivotal movement, disposed in front of at least each first abutment surface is a spring lip which is resiliently deformable about a bending axis parallel to the pivot axis. The spring lip has an end region which is axial with respect to its bending axis, for coupling in the kinetic energy which is transmitted to said spring lip in the position of installation by the second abutment surface, that corresponds to the first abutment surface, of the second overlap region of the adjacent chain link.

20 Claims, 3 Drawing Sheets

(56) References Cited

U.S. PATENT DOCUMENTS

| | | |
|---|---|---|
| 7,040,081 B2 | 5/2006 | Komiya |
| 7,334,388 B2 | 2/2008 | Eckl et al. |
| 7,966,800 B2 * | 6/2011 | Kemper ............. F16G 13/16 59/78.1 |

FOREIGN PATENT DOCUMENTS

| | | |
|---|---|---|
| DE | 69607101 | 11/2000 |
| DE | 102014102626 | 8/2015 |
| EP | 2194292 | 6/2010 |
| EP | 2233782 | 9/2010 |
| EP | 2463547 | 6/2012 |
| JP | S60-211145 | 10/1985 |
| JP | H1-100948 | 7/1989 |
| JP | 2005-256947 | 9/2005 |
| WO | 2005/021996 | 3/2005 |
| WO | 2007/076988 | 7/2007 |

OTHER PUBLICATIONS

English translation of International Search Report from corresponding PCT Appln. No. PCT/EP2017/059239, dated Jul. 18, 2017.
English translation of the Written Opinion of the International Searching Authority from corresponding PCT Appln. No. PCT/EP2017/059239, dated Jul. 18, 2017.
Office Action from related Japanese Appln. No. 2018-555268, dated Nov. 19, 2019. English translation attached.

* cited by examiner

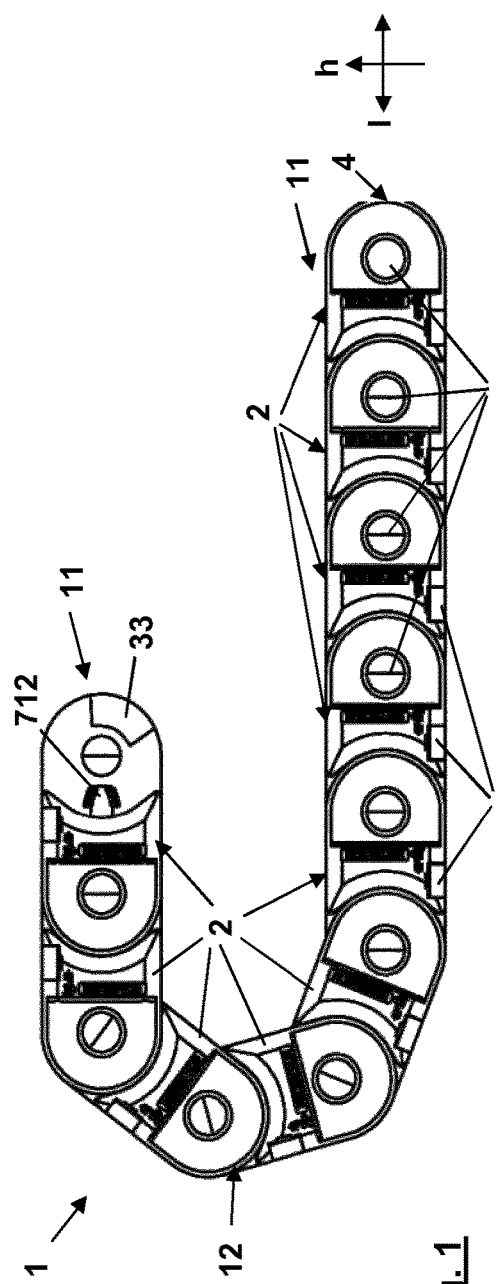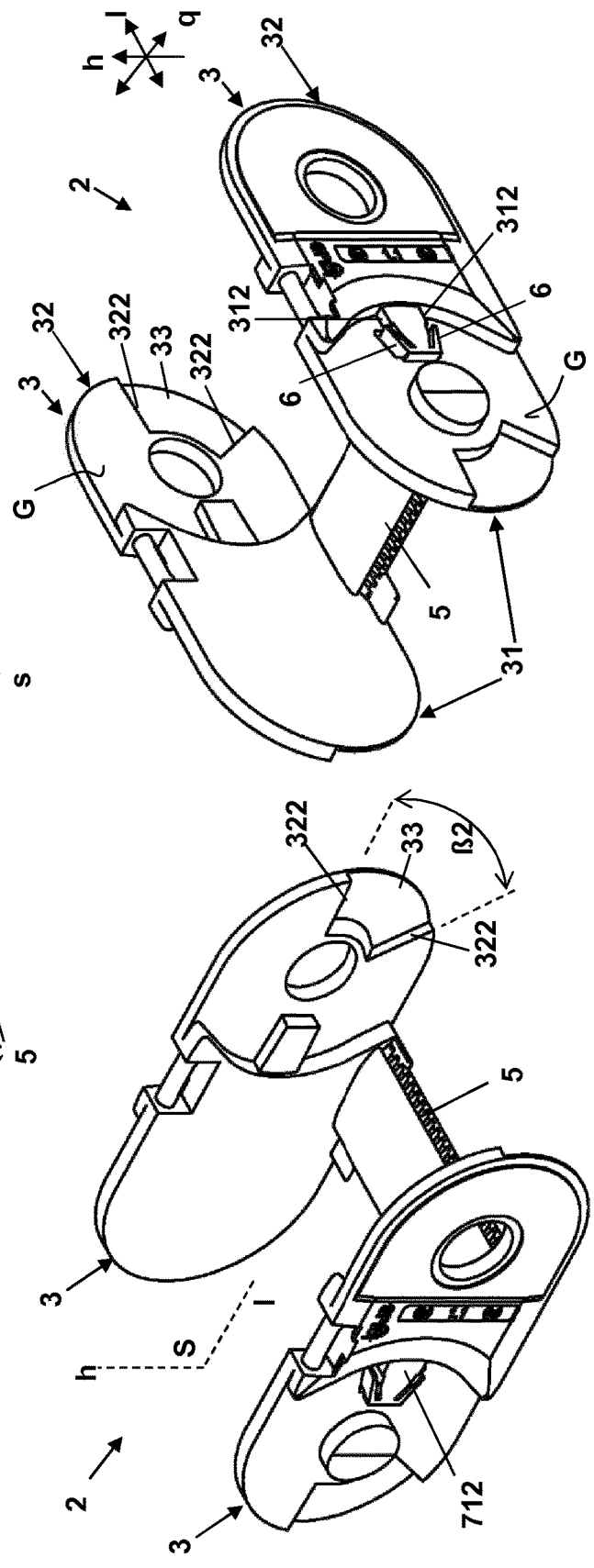
Fig. 1
Fig. 2a
Fig. 2b

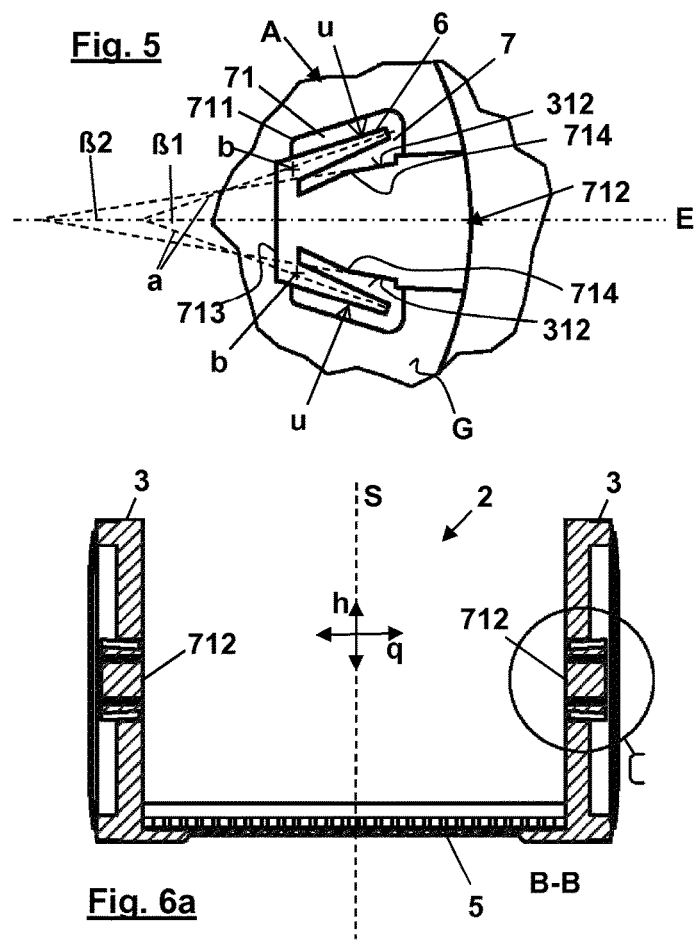
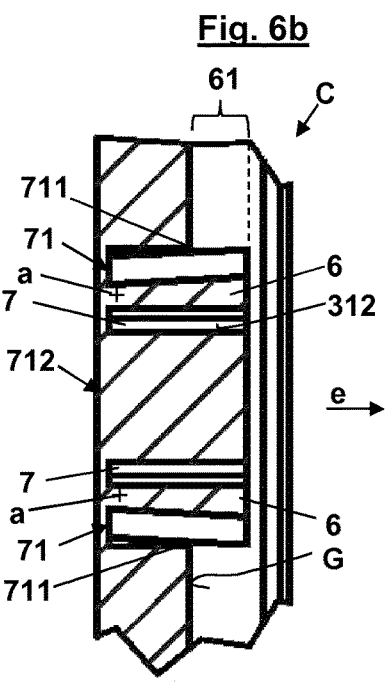
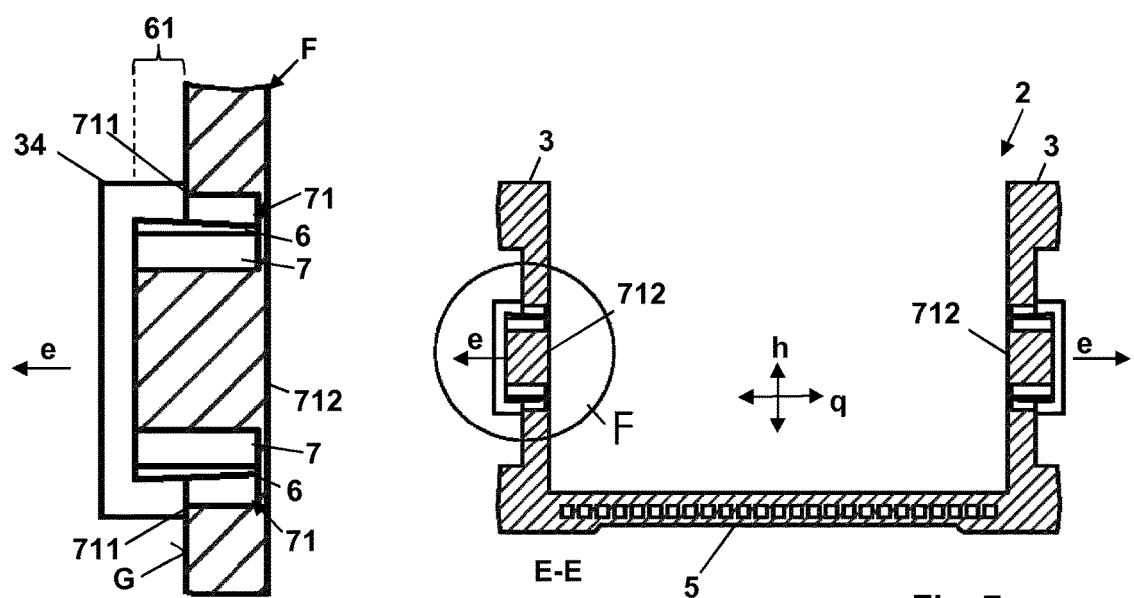

SIDE PORTION, CHAIN LINK AND ENERGY GUIDING CHAIN

FIELD

The invention concerns a side portion for a chain link of an energy guiding chain designed for guiding supply lines, in which adjacent chain links are connected pivotably relative to each other about a pivot axis, wherein the side portion for the pivotable arrangement of adjacent chain links has at the end a respective overlap region which for limiting the pivotal movement is provided with corresponding abutment surfaces, and with a pivot axis, that is to say a first overlap region having first abutment surfaces and a second overlap region having second abutment surfaces, and for damping the deceleration of the pivotal movement arranged in front of at least each first abutment surface is a damping element in the form of a spring lip resiliently deformable about a bending axis parallel to the pivot axis. The invention further concerns a chain link having two such side portions and an energy guiding chain having such chain links.

BACKGROUND

A side portion of the general kind set forth like also a chain link and an energy guiding chain are described in DE 296 07 492 U1, wherein the spring lip associated with a first abutment surface, in a rest position, pivots away from the abutment surface and is pivoted in surface contact against the first abutment surface with first and second abutment surfaces abutting against each other, thereby producing an elastic biasing effect.

EP 1 963 711 A1 discloses an energy guiding chain in which the abutments bear against each other with elastic deflection and deformation of spring lips in the peripheral direction.

In accordance with WO 2005/021996 A1 the first abutment surface is arranged at the inside of a semicircular ring shape, into which a pin in the form of a second abutment involving a certain oversize comes to bear laterally with expansion of the semicircular ring shape, to provide the deceleration effect.

Although a certain damping is achieved thereby in each case a certain residual speed is still maintained, with which the abutment surfaces hit abruptly against each other, with the unwanted generation of noise.

SUMMARY

An object of the invention is to provide a side portion of the general kind set forth and a chain link having two of those side portions and an energy guiding chain with those chain links, in which the residual speed which leads to a more or less abrupt stop is further reduced.

The specified object is already attained in that the spring lip has an end region which is axial with respect to its bending axis for at least predominantly coupling in the kinetic energy which is transmitted to said spring lip by way of the second abutment surface which in the position of installation of the side portion in the chain link of the energy guiding chain corresponds in abutment-operative relationship with the first abutment surface, said second abutment surface being the abutment surface of the second overlap region of the chain link which is adjacent in the position of installation.

Application of the kinetic energy is therefore not effected, as in the state of the art, by way of uniformly extending the spring lip in the direction of the bending axis, but asymmetrically in the end region which is axial with respect to the bending axis. By virtue of that asymmetric transmission of the kinetic energy, besides the bending moment, a torsional moment can also be produced with respect to an axis with is radial with respect to the bending axis; that torsional moment resiliently deforms the spring lip in addition to the resilient bending thereof. In that way it is possible to achieve on the one hand increased absorption of kinetic energy involved in the pivotal movement prior to the state of definitive abutment, and thus a reduction in the residual speed. That is gentler on the material involved and reduces noise. That end region which is axial with respect to the bending axis is arranged to extend away from the side portion.

On the other hand the spring lip can be stressed resiliently to a greater degree by the torsion, than when pure bending is involved. As a consequence of the simultaneous torsion and bending, the spring lip can also become continuously harder in terms of spring characteristics. Thus, a correspondingly higher degree of absorption of kinetic energy is possible, for further resilient deformation. In other words, the deceleration effect at the spring lip can initially be effected gently and can then become progressively greater. The residual speed and thus the generation of noise upon displacement of the energy guiding chain are thus further reduced.

Preferably the at least predominant coupling-in effect of the kinetic energy involves more than 60%, in particular more than 80% or more than 90%. Ideally the kinetic energy can be coupled in, in its entirety. In that way the stressing of the spring lip, as described hereinafter, and the kinetic energy which is absorbed by deformation thereof, can be correspondingly increased and the residual speed can be further reduced.

In particular the application of force produced by the bending moment to the spring lips can occur in a region of the respective spring lip, that is eccentric relative to the radial axis. That eccentric region is equal to the end region which is axial with respect to the bending axis. The radial axis can at least approximately perpendicularly intersect the bending axis.

The spring lip can extend radially or approximately radially with respect to the pivot axis associated therewith. It can be fixed at the end and in particular radially inwardly with respect to the pivot axis on the side portion. In that way the bending axis can be arranged at least close to or at the location of fixing of the spring lip on the side portion.

The side portion can have a usual slide plane for slipping movement of the two overlap regions in the installation position against the respectively associated overlap region of adjacent chain links. In the slide plane, the mutually associated overlap regions of adjacent chain links can slide preferably with play against each other, upon pivotal movement of those chain links about the pivot axis. The slide plane which is perpendicular to the pivot axis has a longitudinal direction and a heightwise direction of the side portion.

In an advantageously structurally simple configuration the spring lip can be sunken with respect to the slide plane and the slide plane is arranged in projecting relationship with the axial end region for the application of force of the bending moment in an extension direction perpendicularly or approximately perpendicularly to the slide plane. In particular the axial end region can be disposed rearwardly on the spring lip in the extension direction. The fact that the spring lip is disposed in front of the abutment surface as described above means that the second abutment surface first encounters the spring lip on the way into the abutment position.

The second abutment surfaces can be respectively arranged in such a way that they can be guided against the spring lip eccentrically relative to the centre line of the spring lip which extends in the peripheral direction. In particular the spring lip can be arranged in the first overlap region in such a way that solely its region which is eccentric relative to the radial axis is arranged to be accessible for the application of force by the second abutment surfaces.

In particular it can be particularly provided that the second abutment surfaces of the second overlap region are arranged to extend in opposite relationship to the extension direction at most as far as the slide plane.

In that way, in the installation position of the side portions in the chain links of the energy guiding chain, upon pivotal movement of adjacent chain links, the second abutment surfaces thereof for damping purposes are guided peripherally only against the respective end region, which projects through the slide plane, of the spring lip of the associated first abutment surface. That can be effected for example at the beginning of the movement limitation, in a partial part of the end region.

In a structurally simple embodiment the spring lip can be arranged in an aperture, the edge of the opening of which is disposed in the slide plane. In that way the engagement region which projects through the slide plane projects out of the aperture in the extension direction. That aperture can be through opening. It can extend through the side portion.

It is preferably provided that the spring lip is arranged fixed at least partially in opposite relationship to the extension direction at a side wall of the side portion. In that way the above-described torsion can be increased and thus the absorption of kinetic energy can be increased, with deceleration of the pivotal movement.

In a structurally simple configuration the aperture can be in the form of a blind opening. In that case the bottom of the blind opening can form the side wall for fixing the associated spring lip. The spring lips can be at least partially arranged fixed at the bottom in the blind opening in opposite relationship to the extension direction. The blind opening has the advantage that here no foreign particles can penetrate into the energy guiding chain.

In a development of the side portion the spring lip, in a rest position, that is to say unloaded and without resilient deformation, can be arranged to extend radially outwardly from the pivot axis of the first overlap region with respect to a radial direction, with at least a main direction component.

In a desirable configuration in regard to increasing the absorption of kinetic energy the spring lip can be of a tapering narrowing configuration in opposite relationship to the extension direction. That is the case in particular when the spring lip is fixed in opposite relationship to the extension direction on the side wall, in particular at the bottom in the blind opening. The tapered configuration makes it possible to achieve a slender configuration, with at the same time unreduced absorption of kinetic energy, by elastic deformation.

Preferably the spring lip or lips in the rest position are oriented exactly radially with respect to the associated pivot axis. In addition, the spring lip can be fixed radially inwardly on the side portion with respect to the pivot axis and from there can preferably extend radially outwardly.

In particular two first abutment surfaces facing in the peripheral direction relative to the pivot axis can be provided in the first overlap region. In that case, as is usual, the one first abutment surface serves to limit the pivotal movement of the pivotably connected side portions or chain links in one pivotal direction and the other first abutment surface serves for limiting the pivotal movement thereof in the pivotal direction opposite thereto. In particular associated with each first abutment surface is a spring lip which is arranged in front of the associated abutment surface in the respective peripheral abutment direction involved.

Preferably, in its rest position, the spring lip can be arranged spaced with respect to the first abutment surface by way of a gap. In that way, for deceleration of the pivotal movement, this can be effected initially solely with deformation of the spring lip without contact thereof against the associated first abutment surface and thus preferably with a relatively soft resilient deformation. That deceleration phase can be adjusted by way of the size of the gap. In conformity with the pivotal movement of the spring lip, the gap can be of a conically opening configuration in a radially outward direction.

There can be provided an abutment projection which extends from the side portion in the extension direction and which has laterally arranged first abutment surfaces. The spring lips can be connected to the abutment projection in such a way that they are resiliently bendable with elastic deformation relative thereto. For that purpose, the spring lips, starting from a side of the abutment projection that is towards the pivot axis, can extend radially or at least approximately radially outwardly with respect to the pivot axis. The spring lips can be arranged fixed at the end at that side. The abutment projection can laterally delimit the aperture.

Preferably the abutment projection is of a mirror-symmetrical configuration with respect to a plane of symmetry extending radially with respect to the pivot axis and in the longitudinal direction of the side portion. In particular the plane of mirror symmetry is defined by both pivot axes of the overlap regions.

In an alternative configuration of the side portion, with respect to the pivot axis of the first overlap region, the two spring lips can be arranged at a first radial angle and the two first abutment surfaces can be arranged at a second radial angle relative to each other. In that case the first radial angle can be larger than the second radial angle. That has the advantage that, in the installation position, the spring lip which is held spaced relative to the associated first abutment surface in the rest position, under a loading by the associated second abutment surface, is urged out of the rest position in the peripheral direction against the first abutment surface, not in a fashion equal to area contact but rather in line contact, and thus hits against the first abutment surface less hard, whereby the generation of noise is damped.

As usual the second overlap region can have an aperture in the manner of a portion of a circular ring relative to its pivot axis, with lateral side surfaces facing in the peripheral direction and forming the second abutment surfaces. In that case however the second abutment surfaces can include a third radial angle which in particular is equal to the second radial angle.

Similarly, as in the case of the first abutment surfaces, in that way in the installation position the second abutment surfaces do not come into line-like or even area-like contact with the respectively associated spring lip, for damping the abutment effect. Rather, when a second abutment surface bears against a first abutment surface, the second abutment surface can come into a first contact with the spring lip with a radially outer region for effective transmission of force at the radially outer end of the spring lip, insofar as the tip is gently resiliently bent with respect to the spring force towards the first contact surface so that the generation of noise can be minimized thereby. In that case it is advantageous if—which can be provided—the spring lips are of a tapering narrowing configuration outwardly with respect to the radial direction, whereby the narrowing end is more softly resilient and thus more easily bendable in the peripheral direction towards the associated first abutment surface.

Thus, the invention can provide that, due to the additional torsion effect, a greater degree of elastic deformation or deformation work on the part of the spring lip can be achieved not only in damping the pivotal movement. In addition, that deformation work can take place in three different phases with an increasing spring constant from soft to hard, wherein the transitions between the phases can be fluid:

A first phase can involve relatively softly elastic bending of the radially outer end of the spring lip with radially outward contact of the second abutment surface against the spring lip, which can be similar to resilient bending in accordance with the state of the art. At the same time as that contact occurring, a torsional moment can be applied with respect to the radial axis, which besides the bending effect causes resilient torsion and thus further resilient stressing of the spring lip. Finally, the third phase can involve area contact between the first abutment surface and the spring lip and/or the spring lip and the second abutment surface, with greater resilient deformation in particular of the spring lip, which is rather hard-resilient. In that way, in the pivotal movement of the two adjacent chain links of the energy guiding chain, the speed of the relative rotary movement can be firstly slowly reduced at the abutments, with a reduction in the generation of noise, then the speed can be progressively increasingly reduced to a residual speed, and possibly can be reduced to close to a standstill.

Overall it can be found that the spring lip according to the invention can be of such an arrangement and configuration that the spring constant thereof increases with increasing plastic deformation in the course of the retardation process. In that way the retardation effect can be initiated in such a way as to be gentle on the materials involved and in particular in a soft fashion with a low level of noise generation, and can then become progressively greater. In that way the residual speed can be at least reduced to such an extent that the generation of noise when abutment occurs can be minimized. In addition, it is possible to set certain phases involving different spring constants, over the retardation process. In that case the spring constant of a phase can also change during the retardation process and in particular can increase.

It will be appreciated that the pivot axes of the overlap regions and thus those of the chain link and those of the energy guiding chain are arranged parallel to each other. In the usual way, the one overlap region can have a pivot pin and the other overlap region can have a pivot opening for receiving a pivot pin, wherein, in the installation position, the axially interengaging overlap regions constitute the pivot axis, by engagement of the pivot pin into the associated pivot opening.

Alternatively, a chain link having two side portions in accordance with one or more of the embodiments described hereinbefore or hereinafter can be provided. In that case the side portions are spaced from each other by way of at least one transverse bar and are arranged symmetrically relative to each other with respect to a plane of mirror symmetry perpendicularly to the transverse direction.

In a development the side portions can be arranged spaced from each other by way of at least one transverse bar. It can be provided that, in the installation position in the chain link, the side portions are arranged symmetrically relative to each other with respect to a plane of mirror symmetry perpendicularly to the transverse direction.

The first overlap regions can be arranged in mutually opposite relationship with respect to the plane of mirror symmetry. The same consequently applies for the second overlap regions.

In addition, the at least one transverse bar can engage the side portions in the usual way in the longitudinal direction between the overlap regions above or below them.

In addition, alternatively there can be provided an energy guiding chain having chain links according to one or more embodiments as described hereinbefore or hereinafter, wherein the chain links each have two side portions according to one or more of embodiments described hereinbefore or hereinafter. The side portions of adjacent chain links can be pivotably connected together in mutually interengaging relationship with mutually corresponding first and second overlap regions, to form a left-hand line of side plates and a right-hand line of side plates.

It is further considered that it is advantageous if the abutment surfaces and spring lips of the side portions, in the installation position of the lines of side plates, are protected outwardly and in particular are arranged protected outwardly between the overlap regions.

BRIEF DESCRIPTION OF THE DRAWINGS

The present invention is described in greater detail hereinafter by means of a number of embodiments illustrated in the drawing of the side portions, the chain links and the energy guiding chain, without the invention however being limited thereto. In the drawing:

FIG. 1 shows a perspective side view of an energy guiding chain with chain links having side portions, FIGS. 2a and 2b each show a perspective side view of a chain link without upper transverse bar, FIG. 5 shows a detail view of the chain link of FIG. 3, FIG. 6a shows a cross-sectional view of the chain link along section line B-B in FIG. 3, FIG. 6b shows a detail view C of FIG. 6a, FIG. 7a shows a cross-sectional view of the chain link along section line E-E in FIG. 3, and FIG. 7b shows a detail view F shown in FIG. 7a.

DETAILED DESCRIPTION (In the description all terms relating to the description of location like up, down, front, rear, right and left are meant in the way the terms are shown in the respective Figure itself, unless otherwise specifically defined). FIG. 1 shows a side view of an energy guiding chain having chain links 2 shown in FIGS. 2-7, wherein chain links 2 which are adjacent in the longitudinal direction are each connected pivotably about a pivot axis s. In this respect all pivot axes s in the energy guiding chain 1 are arranged in a transverse direction q and thus parallel to each other. In this case the energy guiding chain 1 is displaceable in the usual fashion with the formation of two runs 11, by way of a direction-changing arc 12, wherein the chain links 2 are respectively pivoted relative to each other in the transition from a run 11 to the direction-changing arc 12.

The chain links 2 each have two side portions 3 which in the installation position in the energy guiding chain, constitute a left-hand and a right-hand line 4 of side plates. In this respect, in this embodiment of the energy guiding chain 1, the two side portions 3 of each chain link 2 are held in mutually spaced parallel relationship by way of a transverse bar 5 engaging same at the top side and underside. In FIGS. 2 to 7 the upper transverse bar 5 which is releasable here has been removed from the chain link 2 illustrated here while the lower transverse bar 5 is fixedly connected to the side portions 3. Thus, the transverse bar and the side plates of the chain links 2, in the installation position, define a receiving space for supply lines (not shown here).

Figure 3:
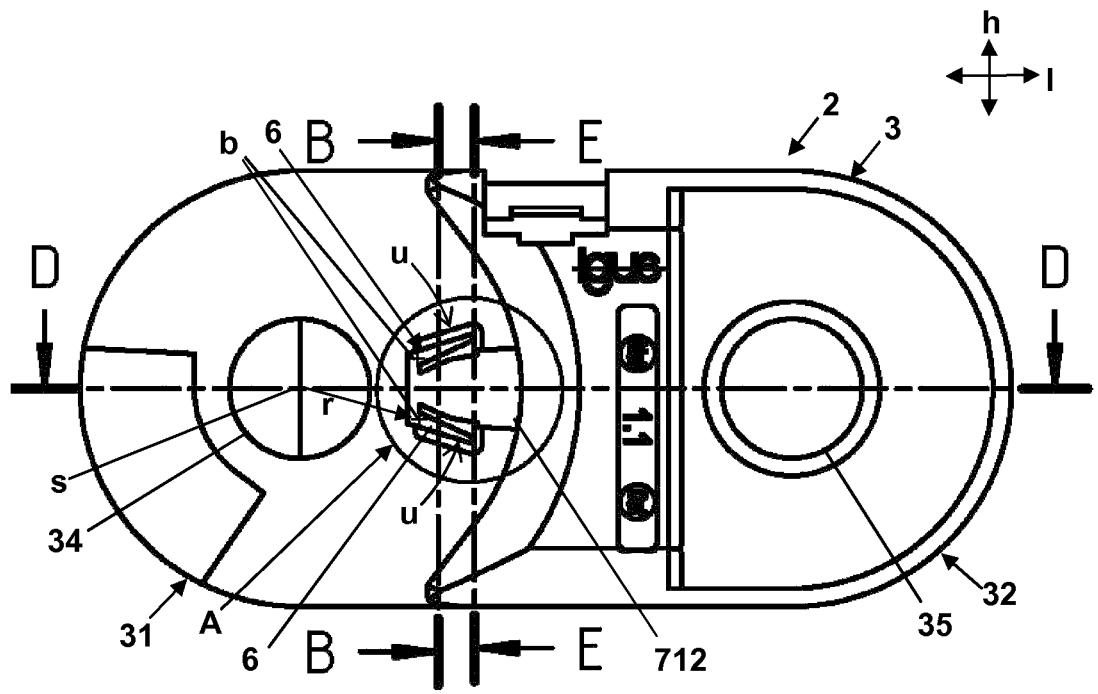
FIG. 3 shows a side view of the chain link of FIG. 2.
Figure 4:
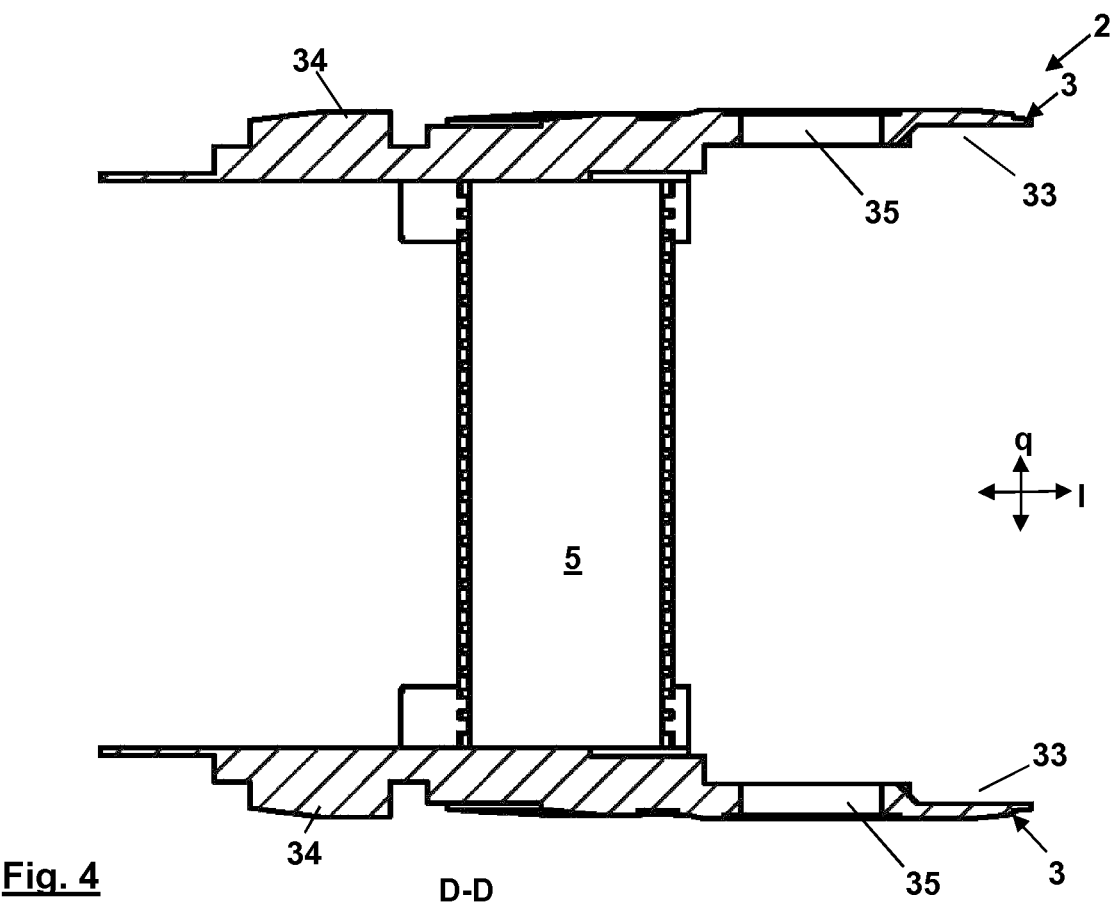
FIG. 4 shows a longitudinal section through a chain link perpendicularly to the heightwise direction h along section line D-D in FIG. 3.

For the pivotable arrangement of adjacent chain links 2 in the energy guiding chain 1, the side portions 3 have at their ends a respective overlap region having the pivot axis s, that is to say a first overlap region 31 and a second overlap region 32. In this case, in the installation position adjacent chain links 2 engage into each other by way of the overlap region 31, 32, thereby forming the pivot axes s, wherein a first overlap region 31 of a chain link 2 cooperates with a second overlap region 32 of the adjacent chain link 2. For that purpose, the side portions 3 each have a respective slide plane G at which the cooperating overlap regions 31, 32 slide with the pivotal movement of the adjacent chain links 2. That necessarily provides that the slide plane G of a side portion 3 is common to both overlap regions 31, 32.

The side portions 3 are arranged in mirror-symmetrical relationship in the respective chain link 2 with respect to a plane S of mirror symmetry which has the longitudinal direction 1 and the heightwise direction h and which is arranged centrally with respect to the transverse direction q.

For limiting the pivotal movement of the chain links 2 adjacent in the energy guiding chain 1, in the usual way, the two overlap regions 31, 32 each have two abutment surfaces, that is to say two first abutment surfaces 311 and two second abutment surfaces 322, wherein in each case a first abutment surface 311 and a second abutment surface 322 cooperate to form the abutment means.

As can be seen in particular from FIG. 5 associated with each of the two first abutment surfaces 311 is a damping element in the form of a spring lip 6 which is arranged spaced by way of a gap 7 in relation to that first abutment surface 311 and which is resiliently deformable about a bending axis b parallel to the pivot axis s. Those spring lips 6 are thus respectively resiliently bendable in the peripheral direction u. The spring lips 6 each have an end region 61 which is axial with respect to the bending axis b thereof, for here at least almost completely coupling in the kinetic energy which is transmitted to that spring lip 6 by the second abutment surface 322 which abuttingly corresponds to the first abutment surface 311 in the installation position of the side portion 3 in the chain link 2 of the energy guiding chain 1, the second abutment surface 322 being that of the second overlap region 32 of the chain link 2 which is adjacent in the installation position. If therefore in the installation position a second abutment surface 322 cooperating with a first abutment surface 311 is guided in the peripheral direction u (FIG. 5) against that first abutment surface 311, then it firstly encounters the spring lip 6 which is disposed in front thereof and which is thereby correspondingly again elastically deformed.

As can best be seen from FIGS. 6 and 7 in conjunction with FIG. 5, the application of force to the spring lips 6, in accordance with the invention, occurs in the end region 61 of the respective spring lip 6, that is eccentric with respect to a radial axis a. In that way, a torsional moment is produced on the respective spring lip 6, with respect to the radial axis a, and that torsional moment leads to resilient stressing. As described in greater detail hereinbefore that permits a correspondingly greater absorption of kinetic energy and thus involves an increased deceleration effect. The bending axis b and the radial axis a are preferably arranged in perpendicularly intersecting relationship.

The two spring lips 6 are respectively arranged in sunken relationship with the slide plane G and are arranged with the end regions 61 projecting perpendicularly through the slide plane G in an extension direction e. In addition, the second abutment surfaces 322 of the second overlap region 32 are arranged to extend in opposite relationship to the extension direction e to the slide plane G. As can be clearly seen from FIGS. 2*a* and 2*b*, in the usual structure, the second abutment surfaces 322 of the second overlap region 32 are formed by an aperture 33 in the manner of a portion of a circular ring being formed out of the slide plane G, the aperture 33 being flanked by the second abutment surfaces 322, wherein the peripheral spacing thereof less the peripheral spacing of the spring lips 6 at the same time approximately marks the pivot angle delimited by the abutment surfaces 311, 322 cooperating in pairs. As can be seen from FIGS. 2*a* and 2*b* abutment surfaces 311, 322 and spring lips 6 are disposed in the installation position between the side portions 3 and are thus arranged protected and covered outwardly.

The spring lips 6 are respectively arranged in an aperture which here is in the form of a blind opening 71 and the edge 711 of the opening of which is arranged in the slide plane G. Thus, solely the eccentric end region 61 is accessible for applying the kinetic energy to the spring lips 6, by virtue of the second abutment surfaces 322.

The spring lips 6 are respectively fixed in opposite relationship to the extension direction e at a side wall of the side portion, by being fixed here at the bottom of the blind opening 71. In that way the spring lip 6 is further stiffened. It involves virtually an increased spring constant. In addition, that arrangement provides that, in comparison with the spring lips not being fixed, at the bottom of the blind opening 71, the radial axis a is presumably sunken approximately to close to the bottom of the blind opening, whereby the torsional moment is correspondingly increased with respect to the radial axis a. This can produce a further increase in stressing of the spring lip 6. The position of the radial axis a shown in FIGS. 6*b* and 7*b* can be considered only as approximate as it was not yet possible to ascertain that precisely. As described above the torsional action on the spring lips 6 and thus the possible absorption of kinetic energy is increased in dependence on a spring travel.

The arrangement has an abutment projection 713 extending in the extension direction e from the side portion 3, and having the laterally arranged first abutment surfaces 311. The spring lips 6 extend from a side 714 of the abutment projection 713, that is towards the pivot axis s, approximately radially outwardly here with respect to the pivot axis s. The spring lips 6 are fixed at their base end at the side 714. That provides that the axial bending axis b thereof is arranged approximately in the base region thereof.

As can be clearly seen in particular from FIG. 5 the arrangement with spring lips 6 and abutment projection 713 is of a mirror-symmetrical configuration relative to a plane E which here contains the two pivot axes s of the overlap regions 31, 32 and is defined thereby. In addition, the two spring lips 6 are arranged at a first radial angle $\beta 1$ with respect to the pivot axis s of the first overlap region 31 and the two first abutment surfaces are arranged at a second radial angle $\beta 2$ relative to each other.

As shown in FIG. 2 the second overlap region 32 has an aperture 33 in the manner of a portion of a circular ring relative to its pivot axis s, with lateral side surfaces facing in the peripheral direction u and forming the second abutment surfaces 322. In this case the second abutment surfaces include a third radial angle, relative to the pivot axis s, of the second overlap region 32, the third angle being equal to the second radial angle β2. Thus, in an abutment position the two associated abutment surfaces 311, 322 bear in surface contact against each other by way of the associated spring lips 6 disposed therebetween.

The first radial angle β1 is larger than the second radial angle β2. As already described in detail hereinbefore the second abutment surface 322 in the first phase of the deceleration process comes into almost point contact with the spring lip 6 which then reacts in a correspondingly soft resilient fashion and thus involves an extremely low level of noise generation. That soft yielding of the spring lip 6 is increased by the spring lip 6 being of a tapering narrowing configuration with respect to the radial direction r. That can be seen from a comparison between the two cross-sectional views in FIG. 6 and FIG. 7. When the first contact occurs, the transmission of force also takes place with the production of the above-described torsional moment, whereby the spring lip 6 is more greatly stressed and thus becomes resiliently harder, in which case that process takes place continuously and thus not with an increase in noise.

The torsional effect can be increased, as can also be seen from FIGS. 6 and 7, by the spring lips 6 being of a tapering narrowing configuration in opposite relationship to the extension direction e. In that way the stressing of the spring lip 6 can be increased by torsion at the bottom of the blind opening 71 and can thus take place where the torsional moment is at its greatest with respect to the axis a, so that the absorption of kinetic energy is optimized by elastic deformation of the spring lip 6. With the first contact of the spring lip 6 against the first abutment surface 311, the transmission of force can occur by way of a line contact region and thus in an increased fashion, which entails further stressing of the spring lip. That is explained in detail hereinbefore, setting forth the different phases in the deceleration process.

As can be seen in particular from the detail view in FIG. 5 the gap 7 enlarges conically radially outwardly laterally at the abutment projection 712, thereby forming an edge 714, wherein the actual first abutment surface 311 begins to the right of the edge 714; the spring lip 6 can be at least partially bent over the edge 714 when it bears against the first abutment surface 311, with an increase in its spring stiffness and thus absorption of kinetic energy. In this case the edge 714 is of a rounded configuration to reduce wear and noise.

Each side portion 3 has a per se known pivot pin 34 and a per se known pivot opening 35 to form the pivotal connection with adjacent chain links 2. The pivotal connection can also be made by means of any other suitable means.

LIST OF REFERENCES 1 energy guiding chain
11 run
12 direction-changing arc
2 chain link
3 side portion
31 first overlap region
312 first abutment surface
32 second overlap region
322 second abutment surface
33 aperture
34 pivot pin
35 pivot opening
4 line of side plates
5 transverse bar
6 spring lip
61 end region
7 gap
71 blind opening
711 opening edge
712 abutment projection
713 side
714 edge
a axis
b bending axis
l longitudinal direction
h heightwise direction
r radial direction
s pivot axis
q transverse direction
u peripheral direction
β1 first radial angle
β2 second radial angle
G slide plane
S plane of mirror symmetry
E plane

What is claimed is:

1. A side portion for a chain link of an energy guiding chain to guide at least one supply line, in which adjacent chain links are connected pivotably relative to each other about a pivot axis, comprising:
   the side portion configured for a pivotable arrangement of the adjacent chain links of the energy guiding chain,
   the side portion having a first overlap region and a second overlap region for limiting a pivotal movement of the adjacent chain links,
   the first overlap region having first abutment surfaces and the second overlap region having second abutment surfaces,
   the side portion having a slide plane for slip movement of the first overlap region and the second overlap region, when the side portion is in an installation position in the chain link of the energy guiding chain, against respectively associated overlap regions of the adjacent chain links,
   a damping element in a form of a spring lip resiliently deformable about a bending axis parallel to the pivot axis arranged in front of each first abutment surface, respectively, for damping the pivotal movement about the pivot axis,
   each spring lip extending in an extension direction which is perpendicular to the slide plane,
   each spring lip being at least partially fixed at a side wall of the side portion, in a plane transverse to the extension direction,
   each spring lip having an end region extending away from the side portion, the end region axial with respect to the bending axis for at least predominantly coupling in kinetic energy which is transmitted to each spring lip, when the side portion is in the installation position in the chain link of the energy guiding chain, by a second abutment surface of one of the adjacent chain links which corresponds in abutment-operative relationship with one of the first abutment surfaces of the side portion, respectively, and wherein each spring lip is arranged in sunken relationship with the slide plane and the end region of the spring lip is arranged in projecting relationship with the slide plane for the application of force of a bending moment in the extension direction.

2. The side portion according to claim 1, wherein the second abutment surfaces of the second overlap region are arranged to extend in a direction other than the extension direction.

3. The side portion according to claim 1, further comprising an aperture, and wherein each spring lip is arranged in the aperture, wherein an edge of an opening of the aperture is arranged in the slide plane.

4. The side portion according to claim 3, wherein the aperture is in the form of a blind opening and each spring lip is arranged fixed and extends in a direction other than the extension direction at least partially at a bottom in the blind opening.

5. The side portion according to claim 1, wherein each spring lip is arranged with at least one main direction component.

6. The side portion according to claim 5, wherein each spring lip is of a tapering narrowing configuration with respect to a direction which is radial with respect to the pivot axis of the first overlap region.

7. The side portion according to claim 1, wherein each spring lip is of a tapering narrowing configuration in a direction other than the extension direction.

8. The side portion according to claim 1, wherein, in an unloaded rest position, each spring lip is arranged spaced by a gap with respect to one of the first abutment surfaces, respectively.

9. The side portion according to claim 1, wherein provided in the first overlap region are the first abutment surfaces facing in a peripheral direction relative to the pivot axis, wherein associated with each first abutment surface is one of the spring lips which is arranged in front of the associated first abutment surface in a respective peripheral abutment direction.

10. The side portion according to claim 9, wherein there is provided an abutment projection which extends in an extension direction from the side portion and has the first abutment surfaces, wherein the spring lips, starting from a side of the abutment projection that faces towards the pivot axis, are arranged extending outwardly with respect to the pivot axis.

11. The side portion according to claim 10, wherein the spring lips are fixed at an end at the side.

12. The side portion according to claim 9, wherein with respect to the pivot axis of the first overlap region, the spring lips are arranged at a first radial angle and the two first abutment surfaces are arranged at a second radial angle relative to each other.

13. The side portion according to claim 12, wherein the second overlap region has an aperture that partially extends around the pivot axis and has lateral side surfaces facing in the peripheral direction and forming the second abutment surfaces, wherein the second abutment surfaces include a radial angle equal to the second radial angle.

14. The side portion according to claim 12, wherein the first radial angle is larger than the second radial angle.

15. A chain link comprising two side portions, each side portion according to claim 1.

16. The chain link according to claim 15, wherein the side portions are arranged in a mutually spaced relationship by way of at least one transverse bar and are arranged symmetrically relative to each other with respect to a plane of mirror symmetry perpendicularly to a transverse direction that is parallel to the at least one transverse bar.

17. An energy guiding chain comprising chain links, each chain link according to claim 15.

18. The energy guiding chain according to claim 17, wherein the side portions of adjacent chain links are pivotably connected together in a mutually interengaging relationship to form lines of side plates by way of mutually corresponding first and second overlap regions.

19. The energy guiding chain according to claim 17, wherein the first and the second abutment surfaces and the spring lips of the side portions are arranged protected outwardly between the first and the second overlap regions of the side portions forming a line of side plates.

20. The side portion according to claim 1, wherein the extension direction is directed towards a second overlap region of an adjacent chain link in the installation position of the energy guiding chain.

* * * * *